July 31, 1934.  A. DEWANDRE  1,968,336
MOTOR BRAKE
Original Filed March 4, 1926
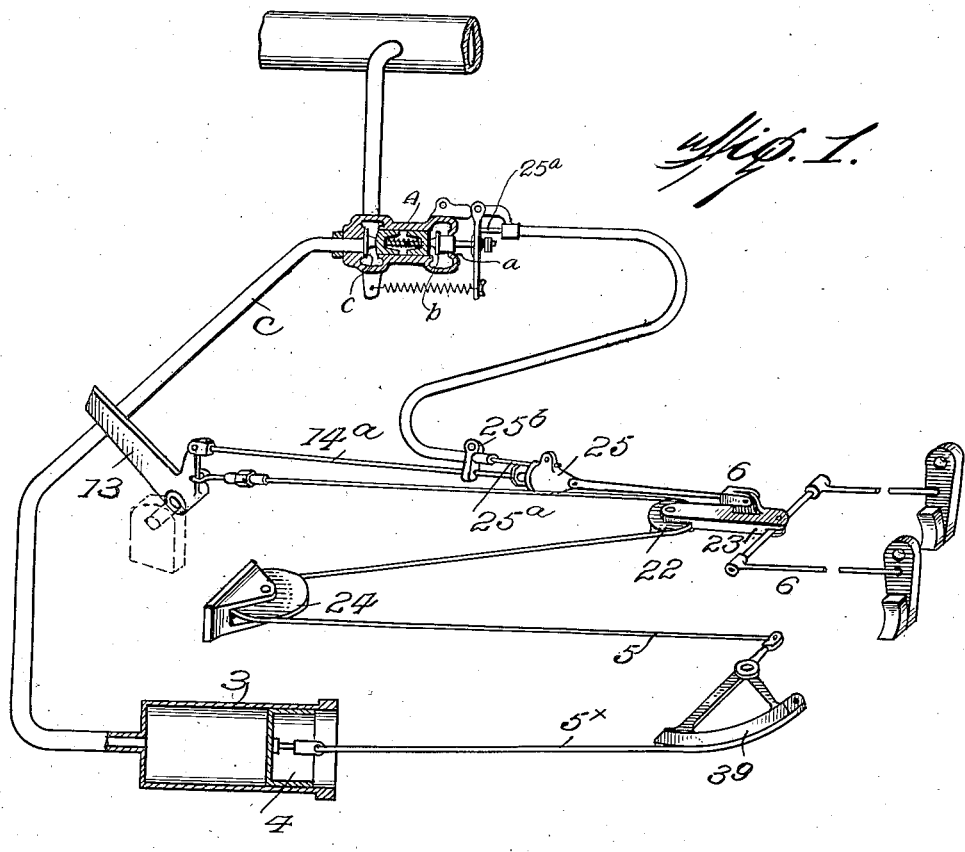
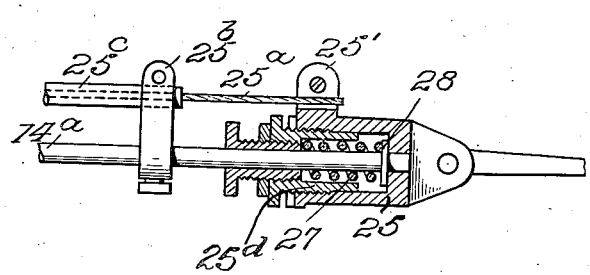
Inventor
A. Dewandre
By
Attorney Patented July 31, 1934

1,968,336

UNITED STATES PATENT OFFICE 1,968,336

MOTOR BRAKE

Albert Dewandre, Brussels, Belgium, assignor to Servo-Frein Dewandre Société Anonyme, Liege, Belgium Original application March 4, 1926, Serial No. 92,243. Divided and this application February 20, 1932, Serial No. 594,332. In Belgium February 12, 1924

4 Claims. (Cl. 188—152)

This invention relates to motor brakes of that type in which the braking force is produced by the action of a partial vacuum induced by the suction of the engine as transmitted to a cylinder in which a brake connected piston is operated, and is a division of application, Serial No. 92,243, filed March 4, 1926, allowed May 26, 1931. The control of the movement of the piston in the cylinder is made by means of a distributor by which the cylinder is, at one side of the piston, placed in communication with the engine suction or with the atmosphere at will, or held in a predetermined position with both the atmospheric and suction communication cut off.

Brakes of this type and controlled in this manner are described in Patent No. 1,539,166, issued to me on May 26, 1925, in which, as well as in the present application, the operating means is so arranged that the effort for actuating the distributor increases with the braking effort exerted by the piston, so that the operator may know the extent of braking action by the effort required on his part to maintain such braking condition.

The invention is illustrated in the accompanying drawing, in which:—

Figure 1 is a perspective view, more or less diagrammatic, illustrating one form of the invention.

Figure 2 is a section through the lost motion device of the form shown in Figure 1.

The motor mechanism includes a cylinder 3 in which operates a piston 4, the cylinder being open to atmospheric pressure on one side of the piston and having pipe communication on the opposite side of the piston with the distributor, so that the cylinder on said latter side of the piston may, through appropriate control of the distributor, be opened to the control of the suction of the engine, be vented to the atmosphere, or be closed against both the atmosphere and engine suction.

In the first mentioned control, the piston will move toward the left in Figure 1; in the second mentioned control the pressure on both sides of the piston will be balanced; and in the third mentioned control, the piston will remain in the position induced by the suction, that is, by the pressure differences at the time the cylinder is cut off both from the suction and from the atmosphere. The first condition naturally operates to apply the brakes, the second condition operates to release the brakes, and the third condition operates to hold the brakes set in any predetermined braking relation.

The brake pedal 13 is connected by a rod 14a to a lost motion device which includes a cylindrical member 25 in which the end of rod 14a plays, the open end of the cylinder being closed by a removable closure 25d and the end of rod 14a being provided with a disk 28 between which and the removable closure for the cylinder there is placed a coil spring 27 which normally tends to hold the disk 28 against the closed end of cylinder 25.

The cylinder 25 is connected to the brake mechanism, here indicated at 6. There is thus a relative or lost motion between the cylinder 25 connected to the brake mechanism and the rod 14a connected to the foot lever 13. The distributor A includes a suction control valve $a$ and atmospheric control valve $b$, for controlling the suction admission through the pipe $c$ leading to the cylinder 3, or the atomspheric vent $d$ through said pipe, a lever $e$ for actuating said valves, as described in the patent above mentioned. The distributor is operated by a Bowden wire connection including a sheath 25c, one terminal of which is connected to a clip 25b secured to the rod 14a, with the opposite end fixed to a support $f$ and a wire 25a freely movable in the sheath 25c and connected at one end to an ear or lug 25' rigid with the cylinder part 25 of the lost motion connection, the opposite end of the wire being connected to a valve operating lever $e$ forming part of the distributor.

Obviously, as the rod 14a moves toward the left responsive to manual operation of the pedal 13, the sheath 25c is correspondingly moved, whereupon, as will be plain from the patent above mentioned, the normally open atmospheric vent controlling valve $b$ is closed and the normally closed suction controlling valve $a$ is opened. As the brakes are applied, the cylindrical member 25 moves forwardly or to the left in Figure 2, bringing the lug 25' closer to the clip 25b and again restoring the relation of the sheath and wire of the Bowden connection to some degree, with the result of permitting the suction valve previously open to close without, however, permitting a sufficient movement of the wire of the Bowden wire connection to permit or cause the atmospheric vent valve to open.

The brake mechanism, here indicated at 6, is connected to the piston 4 through the medium of a cable made up of parts 5 and 5x, one terminal of which is connected to the piston, and through the use of a pivoted sector 39a, such cable 5 is continued around an idle pulley 24 fixed to a convenient part of the frame, thence around a pulley 22 carried in links 23 secured to the brake mechanism 6, and thence to the foot lever 13.

It is to be noted that the movement of the piston 4 responsive to the opening of the suction valve of the distributor will cause the cable parts 5 and 5x to exert a braking movement on the brake mechanism, such of course operating against the fixed point at the foot pedal which is held in operated position by the operator. As the brakes move in response to this cable operation, the parts of the lost motion device are caused to approach the normal, with the result, as before described, of permitting the suction valve of the distributor to close without, however, opening the atmospheric vent valve. The piston 4 then remains under the pressure differences occurring at that moment and the brakes will remain set with that particular pressure.

It will be apparent that when the brakes are set, the pull of the piston on the cable is exerted more or less directly on the foot pedal 13, this particular pull of the cable being of course in opposition to the manual influence on the pedal. The greater the pull of the piston on the cable, the greater will be the pressure of the brakes and the greater will be the pull of the cable on the foot pedal in opposition to the manual pressure thereon. This pull on the foot pedal is therefore directly proportioned to the power of the brake application, and as this action on the pedal is in opposition to the manual influence thereon, such cable pull constitutes what may be termed a reaction, distinctly and positively apparent to the operator and indicating by its extent the power with which the brakes are applied. That is to say, the greater the power of brake application, the greater will be this reaction, and hence the operator is at all times advised as to the braking power being exerted.

If, following any power application of the brakes, additional braking force is required, additional pressure may be applied to the pedal 13 which will produce a repetition of the movement of the operating parts hereinbefore described. This will obviously compel a further movement of the piston and a corresponding increase in the power applied to the brakes.

If it is desired to relieve the brakes, the pedal 13 is permitted to return to normal position, this movement being assisted by the reaction or pull on the cable previously referred to. In this movement of the pedal, the clip 25b moves toward the cylinder 25 under the action of spring 27 assisted by the reactive force of the cable acting on the pedal 13 and through the rod 14a. This relative movement of the clip 25b causes the sheath terminal 25c of the Bowden wire connection to approach the lug 25' and thereby operate the distributor to open the atmospheric vent valve b and vent the cylinder 3 to the point where the pressure on the piston is balanced. In this movement, the spring 27 tends to return to normal position without materially affecting the release of the braking action. In addition, the reflex or reactive action due to the connection of the cable also assists to bring the parts to this position for effecting the release of the brakes. Following the atmospheric balance of the piston, the brakes return to inoperative position incident to the ordinary relief springs provided in brakes of this character, and in this movement tend to move the cylinder 25 to the right, restoring the lost motion connection parts to normal position and maintaining the distributor valves in normal position, that is, with the atmospheric vent valve b open and the suction valve a closed.

I claim:—

1. In a brake system for motor vehicles, the combination of a cylinder, a piston therein responsive to pressure differences, brakes, a manually operable element, a lost motion connection including a cylindrical member having a rigid connection with the brakes, a disk arranged within said member, a rod connecting said disk to the manually operable element, a spring acting to normally hold the member and disk at their relative inward limit, and elements including a distributor relatively movable during those relative movements of the disk and cylindrical member operative through the relative positions of the brakes and manually operable element for controlling the pressure differences on the piston, and a flexible connector between said piston, brakes, and manually operable element acting on movement of the piston to transmit corresponding movement to the brakes and exert a reaction on the manually operable element.

2. In a brake system for motor vehicles, the combination of a cylinder, a piston therein responsive to pressure differences, brakes, a manually operable element, a lost motion connection including a cylindrical member having a rigid connection with the brakes, a disk arranged within said member, a rod connecting said disk to the manually operable element, a spring acting to normally hold the member and disk at their relative inward limit, and elements including a distributor relatively movable during those relative movements of the disk and cylindrical member operative through the relative positions of the brakes and manually operable element for controlling the pressure differences on the piston, and means between said piston, brakes and manually operable element acting on movement of the piston to transmit corresponding movement to the brakes and exert a reaction on the manually operable element.

3. In a brake system for motor vehicles, the combination of a cylinder, a piston therein responsive to pressure differences, brakes, a manually operable element, a lost motion connection including a member having a rigid connection with the brakes, a rod connected to the manually operable element and extending into the member having the rigid connection with the brake, a head on the rod, a spring acting to normally hold the member and the head at their relative inward limit, and means including a distributor operable during the movements of the head and member operative through the relative positions of the brakes and manually operable element for controlling pressure differences on the piston, and means between said piston, brakes, and manually operable element acting on movement of the piston to transmit corresponding movement to the brakes and exert a reaction on the manually operable element.

4. In a brake system for motor vehicles, the combination with brake mechanism, of a brake cylinder, a piston in said cylinder subjected to pressure differences, a valve for controlling the said pressure differences, a control lever governing said valve, cables intermediate and connecting the piston and the control lever, a pulley carried by the brake mechanism and around which one of the cables passes intermediate its ends.

ALBERT DEWANDRE. [L. S.]